(12) United States Patent
Liao

(10) Patent No.: US 11,525,542 B2
(45) Date of Patent: Dec. 13, 2022

(54) ASSEMBLING STRUCTURE FOR ROD TO BE FIXED OR DETACHED WITH STAND

(71) Applicant: Tsun-Chi Liao, Taichung (TW)

(72) Inventor: Tsun-Chi Liao, Taichung (TW)

( * ) Notice: Subject to any disclaimer, the term of this patent is extended or adjusted under 35 U.S.C. 154(b) by 0 days.

(21) Appl. No.: 17/245,983

(22) Filed: Apr. 30, 2021

(65) Prior Publication Data
US 2022/0349516 A1  Nov. 3, 2022

(51) Int. Cl.
*F16M 11/28* (2006.01)
*F16M 11/24* (2006.01)
*F16M 11/10* (2006.01)

(52) U.S. Cl.
CPC ............ *F16M 11/28* (2013.01); *F16M 11/10* (2013.01); *F16M 11/245* (2013.01); *F16M 2200/022* (2013.01); *F16M 2200/027* (2013.01)

(58) Field of Classification Search
CPC ...... F16M 11/28; F16M 11/10; F16M 11/245; F16M 2200/022; F16M 2200/027
USPC ...................... 248/127, 151, 163.1, 405, 408
See application file for complete search history.

(56) References Cited

U.S. PATENT DOCUMENTS

| | | | |
|---|---|---|---|
| 9,961,421 B2 | 5/2018 | Liao | |
| 10,514,278 B1 * | 12/2019 | Becker | G01D 11/30 |
| 10,767,807 B2 | 9/2020 | Kulesia et al. | |
| 2006/0086869 A1 * | 4/2006 | Hsieh | F16M 11/16 248/171 |
| 2007/0012160 A1 * | 1/2007 | Sato | F16M 11/10 84/421 |
| 2008/0078914 A1 * | 4/2008 | Liao | G10D 13/28 248/435 |
| 2013/0042745 A1 * | 2/2013 | Shimada | F16M 11/28 84/421 |
| 2017/0347170 A1 * | 11/2017 | Liao | F16M 11/2021 |
| 2019/0128471 A1 * | 5/2019 | Lin | F16M 11/16 |

* cited by examiner

*Primary Examiner* — Muhammad Ijaz
(74) *Attorney, Agent, or Firm* — Muncy, Geissler, Olds & Lowe, P.C.

(57) ABSTRACT

An assembling structure for a rod to be fixed or detached with a stand is provided, which includes an upper clamp element, a lower clamp element, and a bushing. The upper clamp element and the lower clamp element include an upper clamping space and a lower clamping space respectively. The shapes thereof correspond to the rod to tightly clamp the rod onto the stand. The lower clamp element includes a positioning structure that holds up the stand. The bushing is located between the upper clamp element and the stand body, so that the rod can be quickly pulled out from the upper and lower clamping space with less friction after the upper clamp element and the lower clamp element are loosened. When re-inserted, the rod is positioned through being held up by the positioning structure to meet the usage needs of fast withdrawal or positioning the rod.

8 Claims, 4 Drawing Sheets

ASSEMBLING STRUCTURE FOR ROD TO BE FIXED OR DETACHED WITH STAND

FIELD OF THE INVENTION

The present invention relates to a stand structure of exhibition and studio equipment, and particularly to an assembling structure for a rod to be fixed or detached with a stand.

BACKGROUND OF THE INVENTION

For events such as singing, lectures, interviews, and shooting movies, various exhibition and studio equipment, e.g. microphones, lights, stereo systems, etc. will need to be fixed with the use of stands in order to record sound, set lighting, or play the audio at the appropriate positions. For example, stands being used to fix microphones at a selective height are disclosed in "Microphone stand adjusting structure" of U.S. Pat. No. 9,961,421 B2. To fix the position of a light, a stereo system, or an equipment, stands such as those disclosed in U.S. Pat. No. 10,767,807 B2.

Stands of the prior art can be used to adjust and fix the height of the exhibition and studio equipment, whether it be lights, stereo systems, microphones, etc. The placement height of the equipment is adjusted prior to its use. Once the lights, stereo systems, microphones are in use, no adjustment on height will be performed unless there is a necessity for re-adjustment. In addition, when working in a special room setting, such as shooting a movie or live recording, the placement of the light or microphone frequently needs to be adjusted dynamically to meet the requirements to provide lighting partially on a setting or for live recording. However, stands of the prior art are not designed to be disassembled quickly for dynamically re-adjusting the position of the lights or microphones. As a result, stands of the prior art cannot meet the application requirements of different conditions.

SUMMARY OF THE INVENTION

The primary objective of the present invention is to disclose an assembling structure for a rod to be fixed or detached with a stand that can not only fix the position of the exhibition and studio equipment but also can further meet the needs of quickly assembling and disassembling the exhibition and studio equipment.

To achieve the above objective, the present invention provides an assembling structure for a rod to be fixed or detached with a stand, comprising an upper clamp element, a lower clamp element, and a bushing. The upper clamp element includes an upper clamping space and the shape of the upper clamping space corresponds to the rod to tightly clamp onto the stand. The lower clamp element includes a lower clamping space and the shape of the lower clamping space corresponds to the rod to tightly clamp onto the stand. The lower clamp element includes a positioning structure to hold up the stand. The bushing is located between the upper clamp element and the stand body.

Therefore, after the upper clamp element and the lower clamp element are loosened, the rod can be quickly pulled out from the upper clamping space and the lower clamping space with less friction due to the presence of the bushing. When the column is re-inserted in the upper clamping space and the lower clamping space, the column is being held up by the positioning structure and can therefore be positioned. This is to meet the usage needs of fast withdrawal of the column and positioning the column after re-insertion.

DETAILED DESCRIPTION OF THE PREFERRED EMBODIMENTS

Details and technical content, features, and effect of the present invention are given with the accompanying drawings below.

Figure 1:
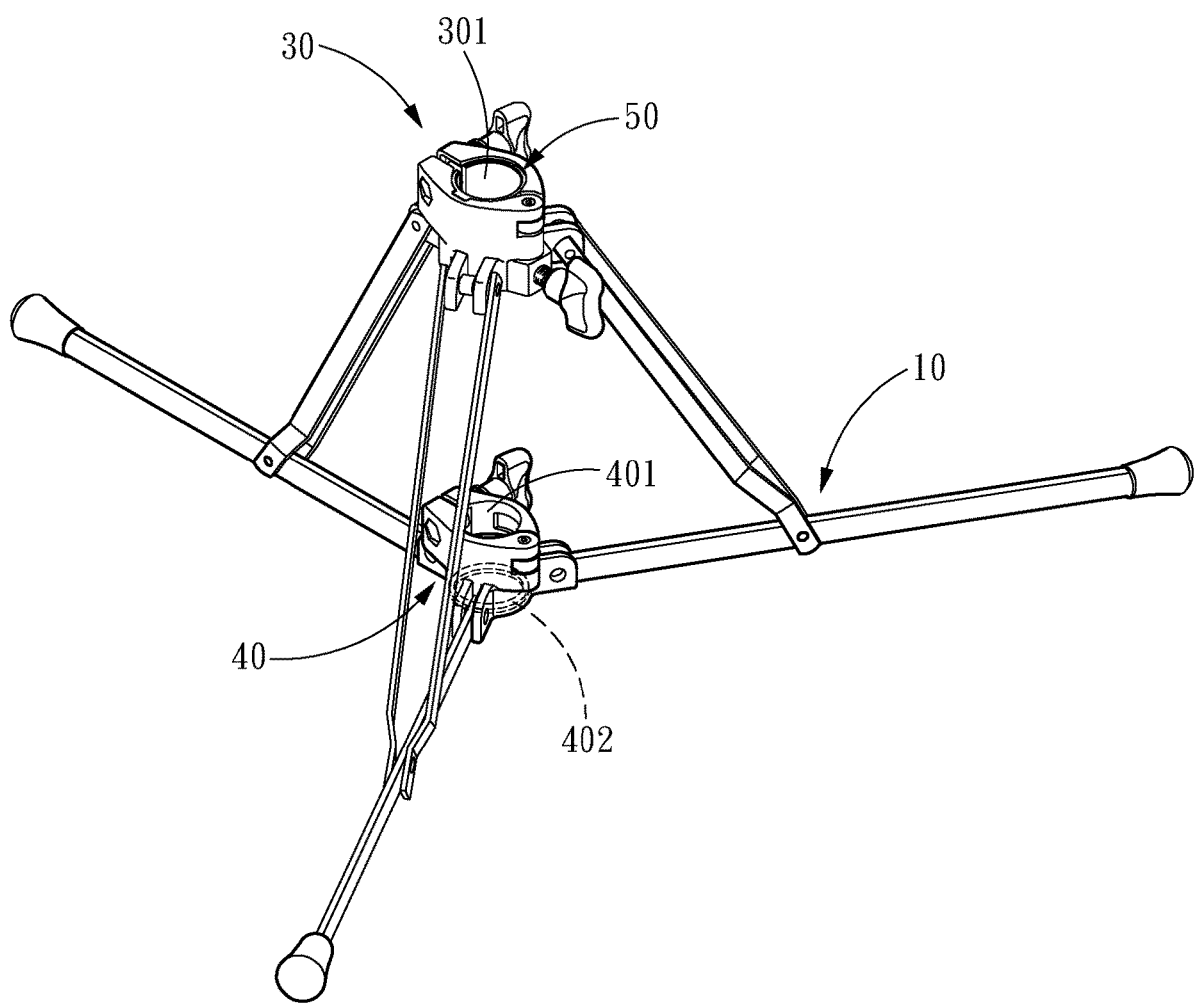
FIG. 1 is a schematic diagram of an assembling structure for a rod to be fixed or detached with a stand of the present invention.
Figure 2:
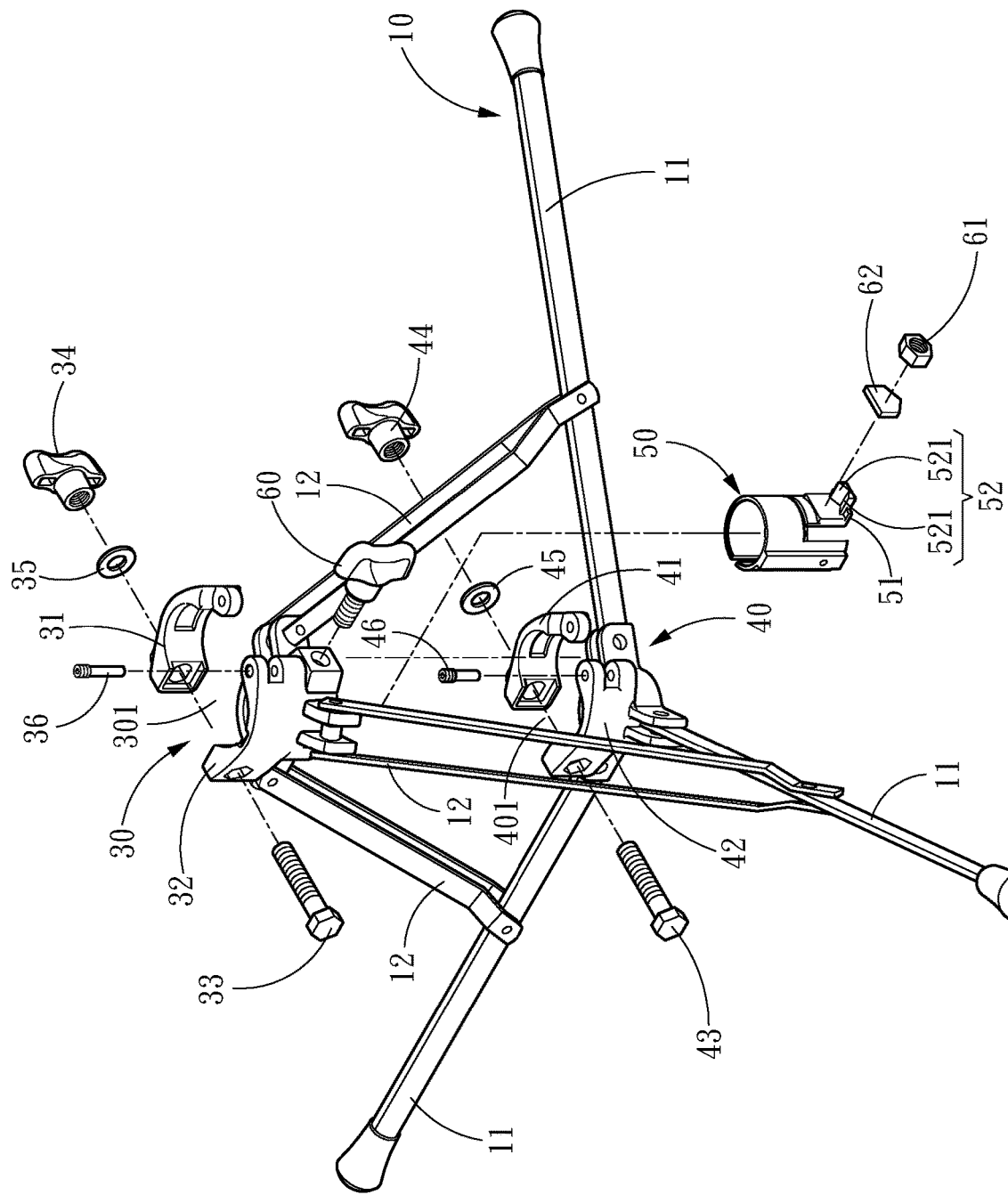
FIG. 2 is an exploded-view diagram of the assembling structure of the present invention.
Figure 3:
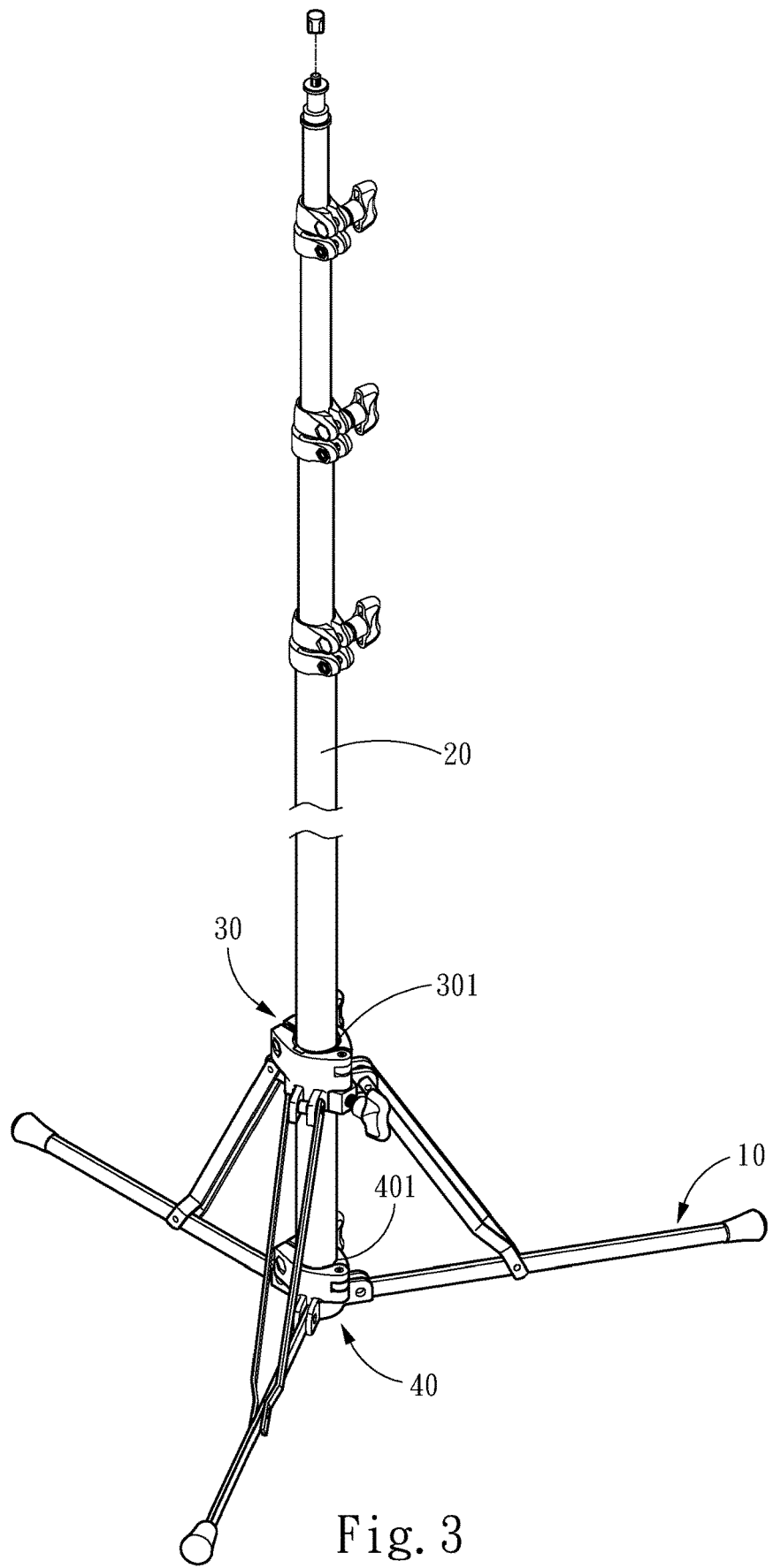
FIG. 3 is a first schematic diagram of installation and operation of the present invention.

Referring to FIG. 1, FIG. 2 and FIG. 3, the present invention provides an assembling structure for a rod 20 to be fixed or detached with a stand 10, comprising an upper clamp element 30, a lower clamp element 40, and a bushing 50, wherein the upper clamp element 30 has an upper clamping space 301 and the shape of the upper clamping space 301 corresponds to the rod 20 in order to tightly clamp onto the stand 10. The stand 10 has three legs 11 and three support arms 12, wherein these three legs 11 are connected to the lower clamp element 40 individually; these three support arms 12 are individually connected to the upper clamp element 30 and those three legs 11 respectively. These three legs 11 can be adjusted to dispread to a designated opening angle based on the requirement and firmly set up on various terrain.

The lower clamp element 40 has a lower clamping space 401 and the shape of the lower clamping space 401 corresponds to the rod 20 in order to tightly clamp onto the stand 10; the lower clamp element 40 has a positioning structure 402 that holds up the stand 10 (as shown in FIG. 1).

The bushing 50 is located between the upper clamp element 30 and the stand 10. In one embodiment, the bushing 50 includes a flange 51; the upper clamp element 30 is screwed by a wing screw 60, wherein the wing screw 60 presses against an upper top surface 52 of the flange 51. To prevent the flange 51 from disengaging from the wing screw 60 due to the rotation of the bushing 50, the upper top surface 52 includes two adjoining planes 521; the intersection of these two planes 521 is located at the lowest point thereof; the wing screw 60 presses against the intersection of the two planes 521. More preferably, the wing screw 60 is screwed into a hexagon nut 61 to directly press against the two planes 521; a pad 62 can be inserted between the wing screw 60 and the bushing 50 to prevent the wing screw 60 from damaging the bushing 50 by the force of screw pressing.

In one embodiment, the upper clamp element 30 includes an upper moving part 31, an upper fixing part 32, an upper locking bolt 33, and an upper locking nut 34, wherein the upper moving part 31 is pivotally connected to the upper fixing part 32 by means of an upper set screw 36 to rotate relative to the upper fixing part 32; the upper moving part 31 and the upper fixing part 32 form the upper clamping space 301 through which the rod 20 is inserted. The upper locking bolt 33 passes through the upper fixing part 32 and the upper moving part 31, and clamps on the upper fixing part 32. The upper locking nut 34 threads onto the upper locking bolt 33; the upper moving part 31 can be pushed closer toward the upper fixing part 32 by rotating the upper locking nut 34 as the stand 10 is clamped tighter. Furthermore, to ensure that the upper locking nut 34 can press against the upper moving part 31, the upper locking nut 34 and the upper moving part 31 have an upper washer 35 installed therebetween.

Similarly, the lower clamp element 40 includes a lower moving part 41, a lower fixing part 42, a lower locking bolt 43, and a lower locking nut 44, wherein the lower moving part 41 is pivotally connected to the lower fixing part 42 by means of a lower set screw 46 to rotate relative to the lower fixing part 42; the lower moving part 41 and the lower fixing part 42 form the lower clamping space 401 through which the rod 20 is inserted. The lower locking bolt 43 passes through the lower fixing part 42 and the lower moving part 41, and clamps on the lower fixing part 42. The lower locking nut 44 threads onto the lower locking bolt 43; the lower moving part 41 can be pushed closer toward the lower fixing part 42 by rotating the lower locking nut 44 as the stand 10 is clamped tighter. Furthermore, the lower locking nut 44 and the lower moving part 41 have a lower washer 45 installed therebetween.

Figure 4:
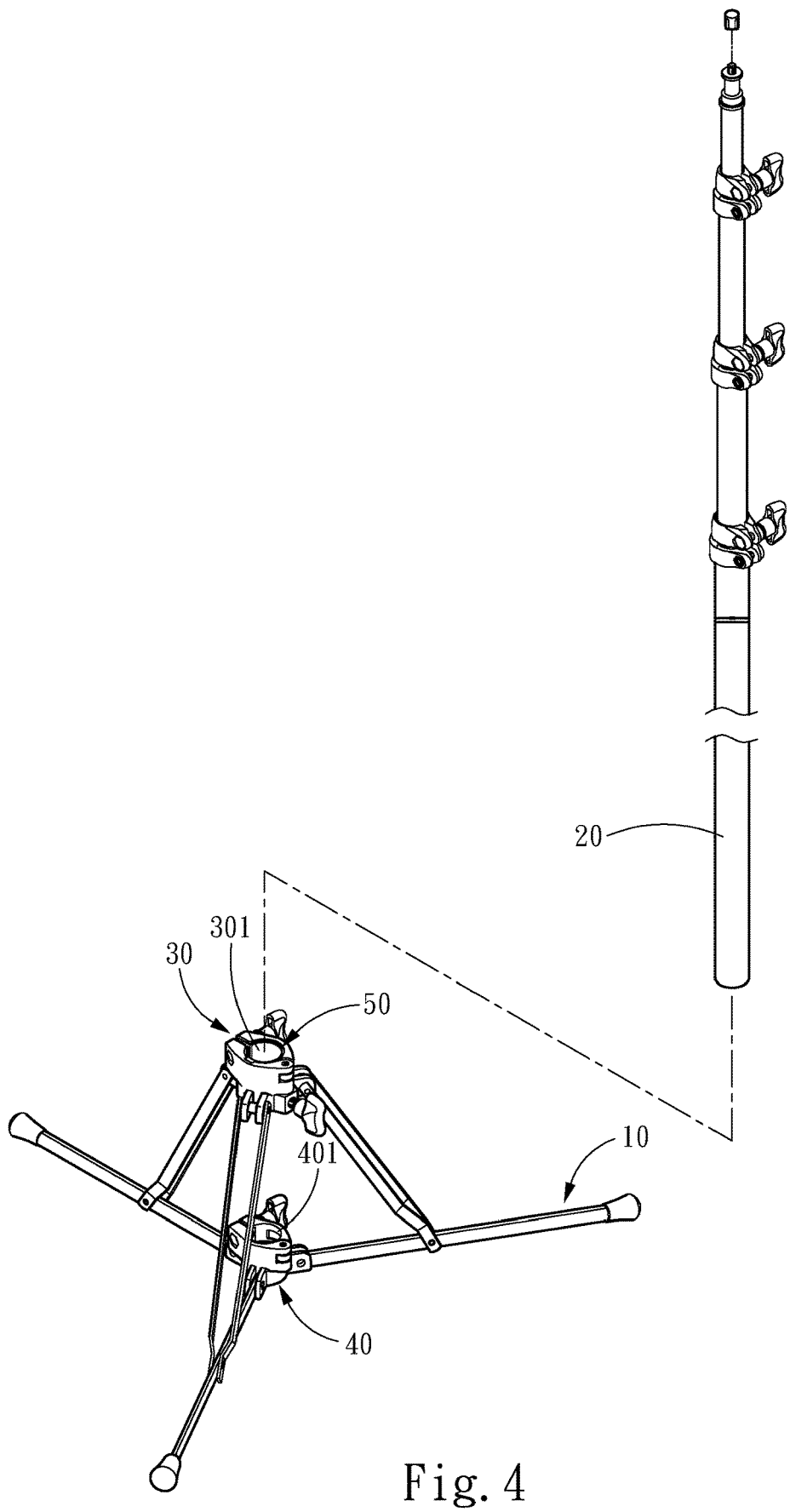
FIG. 4 is a second schematic diagram of installation and operation of the present invention.

Referring to FIG. 3 and FIG. 4, when the upper clamp element 30 and the lower clamp element 40 have been loosened, rod 20 can be withdrawn from the upper clamping space 301 and the lower clamping space 401. When the rod 20 no longer needs to be removed, the rod 20 can be re-inserted into the upper clamping space 301 and the lower clamping space 401, and positioned through being held up by the positioning structure 402 (as shown in FIG. 1).

In summary of the aforementioned descriptions, features of the present invention at least include:

1. After the upper clamp element and the lower clamp element are loosened, the stand exhibits lesser friction owing to the presence of the bushing and can be quickly pulled out from the upper clamping space and the lower clamping space in order to meet the usage needs of fast withdrawal. Thus, when the stand is used for setting up a light or a microphone, if the user needs to change the placement of the light or the microphone at any time in order to optimize the effect of lighting or audio recording, the user can manually set up the light or the microphone to the designated position simply by withdrawing the rod.

2. When the column needs to be re-inserted into the upper clamping space and the lower clamping space, the rod is positioned through being held up by the positioning structure temporarily at the time and subsequently returns back to the fixation state after the upper clamp element and the lower clamp element are locked together tightly.

3. By disposing the flange, the bushing is prevented from being withdrawn together with the rod as the rod is pulled out from the upper clamping space and the lower clamping space.

What is claimed is:

1. An assembling structure, combined with a stand for fixing or detaching a rod, comprising:

an upper clamp element, including an upper clamping space, wherein the shape of the upper clamping space configured to be conformed to the rod to tightly clamp on to the stand;

a lower clamp element, including a lower clamping space, wherein the shape of the lower clamping space configured to be conformed to the rod to tightly clamp on to the stand, and the lower clamp element including a positioning structure to hold up the stand; and a bushing, located between the upper clamp element and the stand, wherein the bushing includes a flange, the upper clamp element is screwed by a wing screw, the wing screw presses against a top surface of the flange, the top surface includes two planes adjoined with each other, a junction of the two planes is located at a lowest point thereof, and the wing screw presses against the junction of the two planes.

2. The assembling structure according to claim 1, wherein the wing screw is screwed into a hexagon nut to directly press the two planes.

3. The assembling structure according to claim 2, wherein a pad is diposed between the wing screw and the bushing.

4. The assembling structure according to claim 1, wherein the upper clamp element includes an upper moving part, an upper fixing part, an upper locking bolt, and an upper locking nut, the upper moving part rotates relative to the upper fixing part, the upper moving part and the upper fixing part form the upper clamping space therebetween through which the rod is inserted, the upper locking bolt passes through the upper fixing part and the upper moving part and clamps on the upper fixing part, and the upper locking nut threads onto the upper locking bolt; and wherein the upper moving part is pushed closer toward the upper fixing part by rotating the upper locking nut as the stand is clamped tighter.

5. The assembling structure according to claim 4, wherein the upper locking nut and the upper moving part include an upper washer installed therebetween.

6. The assembling structure according to claim 1, wherein the lower clamp element includes a lower moving part, a lower fixing part, a lower locking bolt, and a lower locking nut, the lower moving part rotates relative to the lower fixing part, the lower moving part and the lower fixing part form the lower clamping space therebetween through which the rod is inserted, the lower locking bolt passes through the lower fixing part and the lower moving part and clamps on the lower fixing part, and the lower locking nut threads onto the lower locking bolt; and wherein the lower moving part can be pushed closer toward the lower fixing part by rotating the lower locking nut as the stand is clamped tighter.

7. The assembling structure according to claim 6, wherein the lower locking nut and the lower moving part include a lower washer installed therebetween.

8. The assembling structure according to claim 1, wherein the stand includes three legs, separately connected to the lower clamp element, and three support arms, separately connected to the upper clamp element and the three legs respectively.

* * * * *